Nov. 26, 1929.                S. W. NICHOLSON                1,737,120
                           WINDOW OPERATING DEVICE
                           Filed Feb. 20, 1928         2 Sheets-Sheet 1
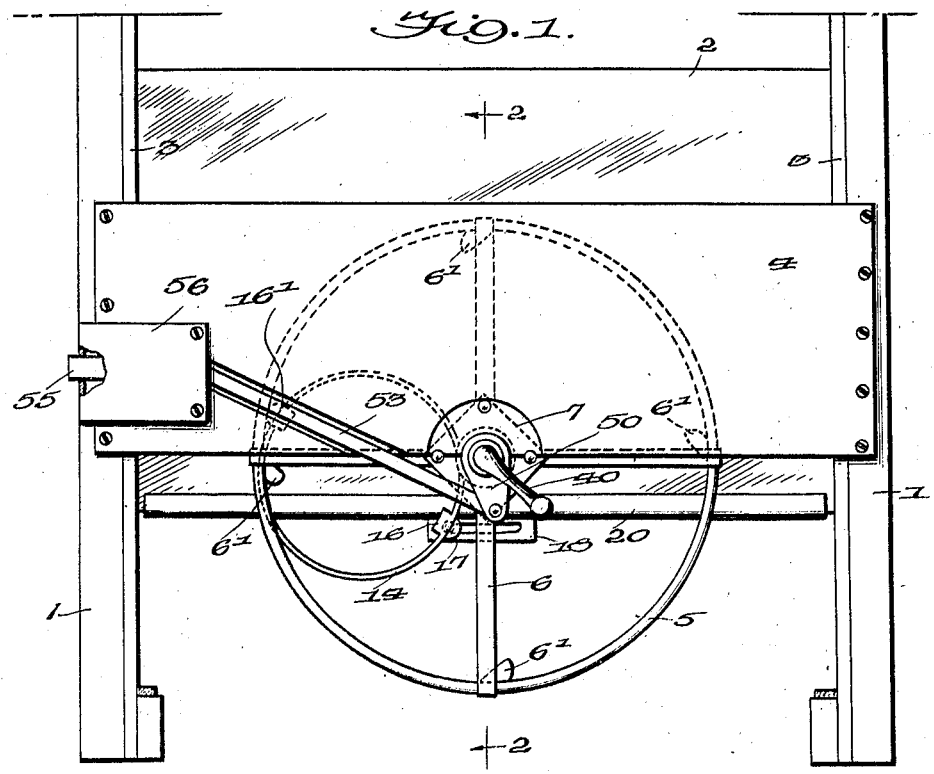
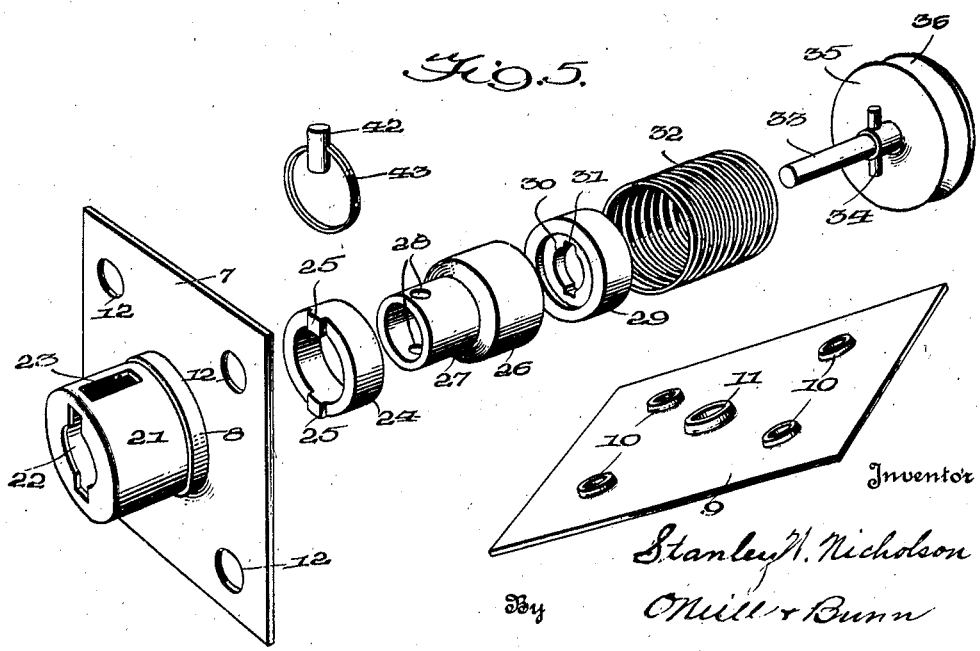
Inventor
Stanley W. Nicholson
By O'Neill + Bunn
Attorneys

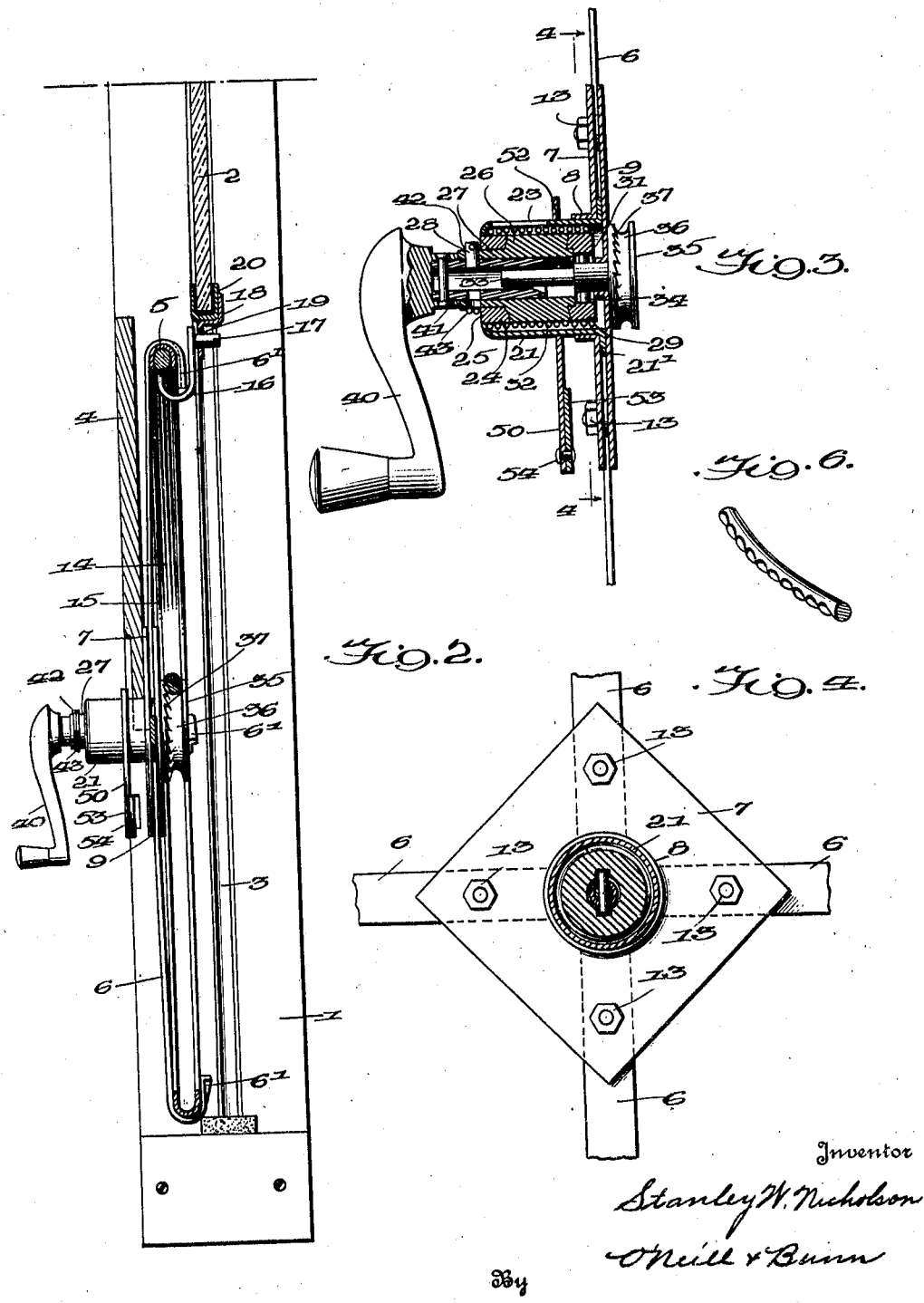

Patented Nov. 26, 1929

1,737,120

UNITED STATES PATENT OFFICE

STANLEY W. NICHOLSON, OF TOLEDO, OHIO, ASSIGNOR TO THE LOCLIF COMPANY, OF TOLEDO, OHIO

WINDOW-OPERATING DEVICE

Application filed February 20, 1928. Serial No. 255,738.

The invention relates to mechanism for operating automobile windows and similar devices, preferably associated with means for retracting the latching bolt, of the general character disclosed in my copending application Serial No. 219,463, filed September 14, 1927, the object of the present invention being to provide certain structural and operative improvements in the apparatus of the application aforesaid.

The invention is illustrated in the accompanying drawings, in which:—

Fig. 1 is a fragmentary front elevation of an automobile door frame to which the window operating and latch retracting mechanism is applied.

Fig. 2 is an enlarged sectional elevation on line 2—2 of Fig. 1.

Fig. 3 is an enlarged sectional fragmentary side elevation of the operating handle and appurtenant devices.

Fig. 4 is a section on line 4—4 of Fig. 3.

Fig. 5 is an exploded perspective of the support, driving gear and clutch mechanism interposed between the latter and the operating handle.

Fig. 6 is a fragmentary perspective of the driven gear.

Referring to the drawings, 1, 1 indicate the stiles of an automobile door frame, in which the glass or window element 2 slides vertically in grooves 3, 3 in its opening and closing movements. Secured to the inside of the door stiles is a cross panel 4, which serves as a support for the operating mechanism and carries the usual lock provided with a spring actuated latching bolt.

Secured to the outer face of the panel 4 is the support for the apparatus comprising an inner plate 7 having an enlarged central opening surrounded by an annular flange 8, and an outer plate 9 having a central extruded bearing 11 and extruded hollow bosses 10 adapted to engage openings 12 in the plate 7 to cause the plates to register and to be retained in spaced relation, the plates being secured together and to the panel 4 by means of bolts 13 passing through the hollow bosses 10, the openings 12 and registering openings in the panel.

Likewise secured between the plates 7 and 9 by the bolts 13 are radial arms 6, four in number, which support an annular trackway 5 having an interior guiding groove, as in the device of my application aforesaid, the radial arms or spokes 6 preferably being secured to the annular trackway 5 by spot welding, the parts being so constructed and arranged as to maintain the annular trackway substantially concentric with the central aligning openings in the plates 7 and 9. Preferably, the ends of the arms or spokes 6 are provided with extensions which are bent over the outer periphery of the trackway and extend inwardly of the latter in the form of cam 6', the function of which will be explained hereinafter.

Mounted in the central opening of the plate 7 is a cup-shaped housing 21 having a peripheral flange 21' at one end, which is adapted to be clamped between the plates 7 and 9 so as to impose a certain frictional resistance to the rotation of the housing, but which will permit rotation upon the application of a sufficient force. The opposite end of the housing 21 has a central perforation 22 with radial notches and an opening 23 is also provided in the cylindrical wall of the housing. Mounted in the housing 21 is a series of collars, disposed in axial alignment, preferably having their outer peripheral surfaces in registry. The innermost collar 24 constitutes an anchoring element and is provided with ribs or keys 25, which register with the radial slots of the central opening 22 in the housing 21, whereby the anchoring collar 24 is locked to the housing. The second collar 26 is provided with a reduced portion 27 which telescopes with the collar 24 and extends through the opening 22 in the housing 21, said extension 27 being provided with diametrically opposite openings 28. The outer collar 29 is partially telescoped with the outer end of collar 26, and has a central opening 30 provided with radial recesses 31 adapted to receive a cross pin 34 in shaft 33, which latter is journaled in the bearing 11 in plate 9, the inner reduced end of the shaft 33 extending part way into the housing.

Secured to the outer end of the shaft 33 is a driving gear 35, the peripheral edge of which is grooved, as at 36, and one wall or face of the groove is provided with gear teeth 37, which are preferably in the form of ratchet teeth each having one inclined face and one face parallel with the axis of rotation of the gear.

Mounted within the housing 21 and engaging the peripheral surfaces of the several collars 24, 26 and 29 is a helical spring clutch device, which may take the form of a single helix of spring wire, which is maintained in frictional engagement with the cylindrical surfaces of the collars, or which, if desired, may comprise two separate helical spring elements which engage collars 24, 26 and 26, 29, respectively. Engaging the driving gear 35 and in rolling contact with the channel of the annular trackway 5 is a driven gear 14 which is preferably formed of an annulus of relatively heavy spring steel wire, of a size to fit the groove 36 in the driving gear 35 and the channel in the trackway 5, one lateral face of the ring gear, at approximately forty-five degrees to the axis of rotation of the gear, being provided with gear teeth to mesh with the gear teeth on the driving gear 35, and preferably having ratchet teeth oppositely inclined to the ratchet teeth on the driving gear and meshing therewith, the normal spring tension of the ring gear serving to hold the same in engagement with the driving gear and with the annular trackway, the resiliency of the ring gear permitting the ring to be deformed sufficiently to enable the same to be sprung into engagement with the driving gear and the annular track and also allowing the ring to yield under heavy pressure.

Secured to the ring gear 14, preferably by spot welding, is a U-shaped bracket 16, the outer end of which carries a pin 17, which engages a slot 19 in a plate 18 attached to the under side of a channel member 20, which embraces the lower edge of the glass or window element 2.

A rotary handle 40, preferably in the form of a crank, has a hollow shank 41, which telescopes into the opening in the collar 26 and is locked to said collar by a pin 42 engaging registering openings in the shank 41 and the reduced section of the collar 26, the pin being held in place by means of a spring ring 43 threaded through an opening in the pin and surrounding the reduced end 27 of the collar 26. The counterbored center of the shank 41 constitutes a bearing for the inner end of the shaft 33, when the parts are assembled.

Mounted on the housing 21 is a crank arm 50 having an opening in one end which engages the housing and is provided with a tongue 52, which engages the opening 23 in the housing 21, so that the crank arm partakes of any rotary movement imparted to the housing. Connected by pivot 54 to the lower end of the crank arm is a link 53, which is connected at its upper end to the bolt 55 of the automobile door lock 56, which bolt is normally held in its projected position by a spring.

The operation of the device, both in its window actuating and bolt retracting functions, is similar to that described in my copending application aforesaid, namely, a continuous clockwise rotation of the handle 40 will alternately and successively raise and lower the glass or window element 2, while a counterclockwise movement of the handle will not effect the window element at all, but will retract the bolt 55 of the door lock 56 and permit the door to be opened. In the window operating function, the rotation of the handle 41 imparts rotation to the driving collar 26 and this movement is transmitted by the helical spring clutch 32 to collar 29 and through the described pin and slot connection to the shaft 33, to the outboard end of which the driving gear 35 is secured. The rotation of the driving gear 35 causes the ring gear 14 to roll in the annular track 5 and to revolve about the driving gear, thereby causing the pin 17, carried by the bracket 16 and located adjacent the periphery of the ring gear, to reciprocate between the upper and lower ends of the diameter of the annular trackway, to raise and lower the window element 2, by the engagement of the pin 17 with the slotted plate 18, which is connected to the supporting channel 20, which engages the lower end of the glass or window element 2. As the ring gear revolves about the driving gear, the pin 17 traces a lenticular or flattened elliptical course, so that the pin exercises a substantially vertical lift on the glass in the opening movement of the latter and, in the closing movement of the window element, the weight of the glass, just after the pin has passed the upper dead center, will be effective in causing the ring gear to drive the driving gear and the completion of the opening movement will be effected without further effort on the part of the operator, the glass sliding quickly to its fully opened position. In this automatic completion of the opening of the glass, the handle will not race and, as a matter of fact, will not be rotated at all, and, if rotated by hand, will have no effect on the window element, for as soon as the weight of the glass becomes effective to drive the gear 35, the rotation of collar 29 will tend to unwind or relieve the tension of the portion of the helical spring clutch 32 which engages the collar, so that the spring clutch will be ineffective to drive the handle, if the latter be held by the operator. In the lifting movement, however, the spring clutch retains effective control of the connection between the handle 40 and the driving gear 35, by reason of the engagement of said spring clutch with the driving collar 26 and the driven collar 29. Owing to the fact that the diameter of the ring gear 14 is less than half the diameter of the trackway 5 in which it revolves about the driving gear 35, it is obvious that the pin 17 connecting the ring gear to the window element would lag behind and lose distance at each operation. In order to correct this difficulty, the cams 6' are provided, the cams at the ends of the vertical diameter of the trackway being engaged by the bracket 16 carrying the pin 17, as the pin reaches the upper and lower limits of its movement, respectively, the faces of the cams being so fashioned as to advance the pin by an amount which it has lost in the preceding quarter revolution of the ring gear. Diametrically opposite the bracket 16 is a second lug or bracket 16', which engages the cam 6' at the ends of the horizontal diameter of the rackway 5 and advances the pin by an amount equal to that lost in the preceding quarter revolution. The correction of the travel of the pin at each quarter revolution maintains the same in its proper loose sliding connection with the slotted bracket 18 and relieves the device of excessive strains, which would be put thereon should the pin and slot connection between the ring gear and the window element, alone be depended upon to keep the ring gear approximately in step.

When it is desired to retract the latching bolt of the door lock, the handle 40 is rotated in a direction opposite to that required to actuate the window element. This rotatory movement effects a similar movement of the collar 26, which causes the spring clutch element 32 to tighten its grip on the anchoring collar 24 and impart a similar rotatory motion thereto and, as the collar 24 is locked to the housing 21 by the engagement of the keys or lugs 25 on said collar with the radial slots in the ends of the housing 21, said housing will be rotated with the collar 24. However, inasmuch as the housing 21 is held against rotatory movement by the clamping action of plates 7 and 9 on the flange 21' of the housing, it is obvious that the force applied to rotate the handle in the latch retracting operation will have to be great enough to overcome the frictional resistance of the coupling between the housing and the clamping plates 7 and 9 and also the force of the spring in the lock which normally tends to project the latch bolt. However, a relatively small rotatory movement of the handle 40 will be sufficient to retract the bolt by the action of the crank arm 50 carried by the housing and the pull rod or link 53, which connects the crank arm with the bolt. As soon as the bolt has been retracted and the door opened, the release of the handle 40 permits the bolt to be projected by the spring.

It will be seen, therefore, that the window element is operated in both its opening and closing movements by a continuous rotation of the handle in one direction and that the retraction of the latching bolt is effected by a partial rotation of the handle in the opposite direction and these operations are rendered possible by the simplified coordination of the handle 40, driving gear 35 and housing 21 with the driving collar 26, the driven collar 29, the anchoring collar 24 and the helical spring clutch device 32. In fact, the combination of the three collars with the helical spring clutch member presents five distinct elements of utility, which are of particular advantage in this apparatus, to wit, to connect the driving gear of the window operating mechanism with the operating handle; to prevent overthrow of the operating mechanism; to lock the operating mechanism in its lifting action, the reactive force, due to the weight of the window, being transmitted by the spring clutch device to the anchoring collar 24; the reverse movement of the handle effects a retraction of the latching bolt without effect on the window element, the motion of the handle being transmitted from driving collar 26 through the spring clutch device to anchoring collar 24, thence to the housing 21; and finally the rapid automatic lowering movement of the window, after the pin on the ring gear has passed the upper dead center, is effected without rotation of the operating handle, provided the latter is lightly held by the hand of operator.

The device as a whole is applicable to any standard automobile door or similar construction which involves a sliding window element and a latching bolt, and affords a highly efficient and relatively simple device for controlling both the window element and the bolt by a single operating handle.

What I claim is:

1. A window operating device comprising a shaft, a driving gear thereon having a grooved periphery with gear teeth on one lateral face of the groove, a fixed annular track substantially concentric with the gear, a driven gear rolling in said track and in the groove of the driving gear, the latter having teeth disposed on a lateral peripheral face to mesh with the teeth on the driving gear, and a sliding connection between the driven gear and the window element.

2. A window operating device comprising a shaft, a driving gear thereon having a grooved periphery with gear teeth on one lateral face of the groove, a fixed annular track substantially concentric with the gear, a driven ring gear rolling in said track and in the groove of the driving gear, the latter having teeth disposed on a lateral peripheral face to mesh with the teeth on the driving gear, and a sliding connection between the driven gear and the window element.

3. A window operating device comprising a shaft, a driving gear thereon having a grooved periphery with gear teeth on one lateral face of the groove, a fixed annular track substantially concentric with the gear, a resilient driven ring gear rolling in said track and in the groove of the driving gear, the latter having teeth disposed on a lateral peripheral face to mesh with the teeth on the driving gear, and a sliding connection between the driven gear and the window element.

4. A window operating device comprising a shaft, a driving gear thereon having a grooved periphery with ratchet-shaped gear teeth on one lateral face of the groove, a fixed annular track substantially concentric with the gear, a driven gear rolling in said track and in the groove of the driving gear, the latter having ratchet-shaped teeth disposed on a lateral peripheral face to mesh with the teeth on the driving gear, and a sliding connection between the driven gear and the window element.

5. A window operating device comprising a shaft, a driving gear thereon having a grooved periphery with ratchet-shaped gear teeth on one face of the groove, a fixed annular track substantially concentric with the gear, a driven ring gear rolling in said track and in the groove of the driving gear, the latter having ratchet-shaped teeth disposed on a lateral peripheral face to mesh with the teeth on the driving gear, and a sliding connection between the driven gear and the window element.

6. A window operating device comprising a shaft, a driving gear thereon, a driven gear meshing therewith, connections between the driven gear and the window element, a rotary handle, and means for connecting the handle with the shaft including a collar connected to the shaft, a collar fixed to the handle, an anchored collar, and a double acting helical spring clutch device engaging the peripheral surfaces of said collars.

7. A window operating device comprising a shaft, a driving gear thereon, a driven gear meshing therewith, connections between the driven gear and the window element, a rotary handle having a shank telescoping with said shaft, and means for connecting the handle with the shaft including a collar connected to the shaft, a collar fixed to the handle, an anchored collar, and a double acting helical spring clutch device engaging the peripheral surfaces of said collars.

8. A window operating device comprising a shaft, a driving gear thereon, a driven gear meshing therewith, connections between the driven gear and the window element, a rotary handle having a shank telescoping with said shaft, and means for connecting the handle with the shaft including a collar connected to the shaft, a collar fixed to the handle shank, an anchored collar telescoping with the collar on the shank, and a double acting helical spring clutch device engaging the peripheral surfaces of said collars.

9. A combined window operating and latch retracting mechanism comprising a support, a shaft journaled therein, a driving gear fixed to the shaft, a driven gear meshing therewith, connections between the driven gear and the window element, a rotary handle, a collar connected to the shaft, a collar fixed to the handle, an anchoring collar, a double acting helical spring clutch device engaging the peripheral surfaces of said collars, a housing locked to the anchoring collar and clamped to said support to impose a frictional resistance to rotation of said housing, and a link connection between the housing and the latching bolt.

10. A combined window operating and latch retracting mechanism comprising a support, a shaft journaled therein, a driving gear fixed to the shaft, a driven gear meshing therewith, connections between the driven gear and the window element, a rotary handle, a collar connected to the shaft, a collar fixed to the handle, an anchoring collar, a double acting helical spring clutch device engaging the peripheral surfaces of said collars, a housing locked to the anchoring collar and clamped to said support to impose a frictional resistance to rotation of said housing, a crank arm locked to said housing, and a link connecting said crank arm with the latching bolt.

In testimony whereof I affix my signature.

STANLEY W. NICHOLSON.